Sept. 25, 1934.  E. W. CURTIS ET AL  1,974,806
SURFACING MACHINE
Filed Feb. 21, 1931    5 Sheets-Sheet 2

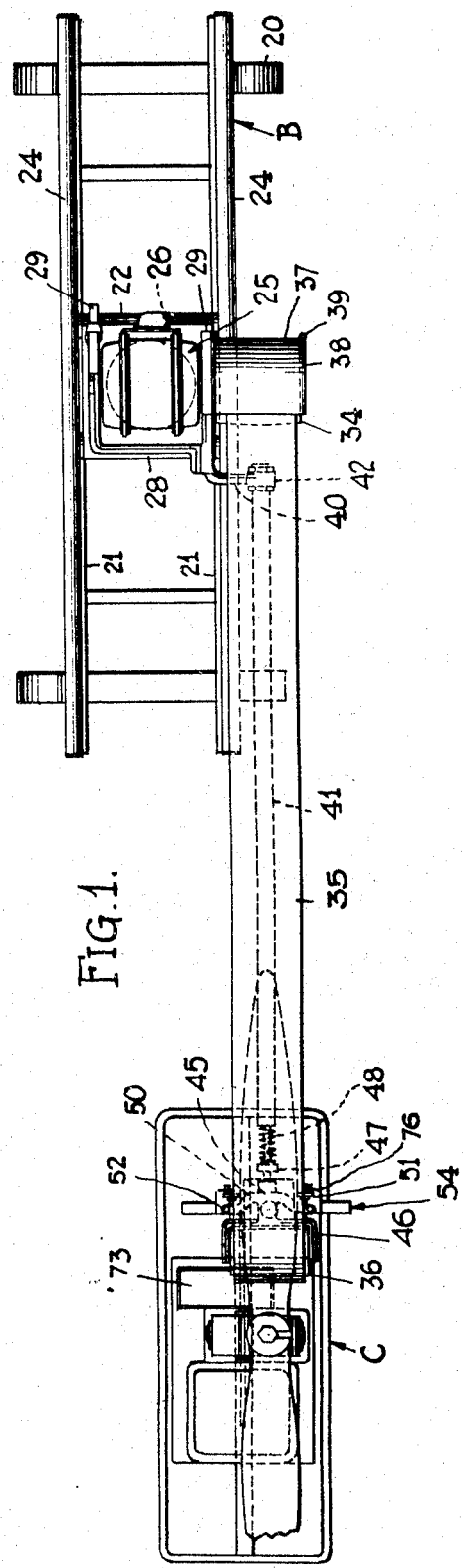
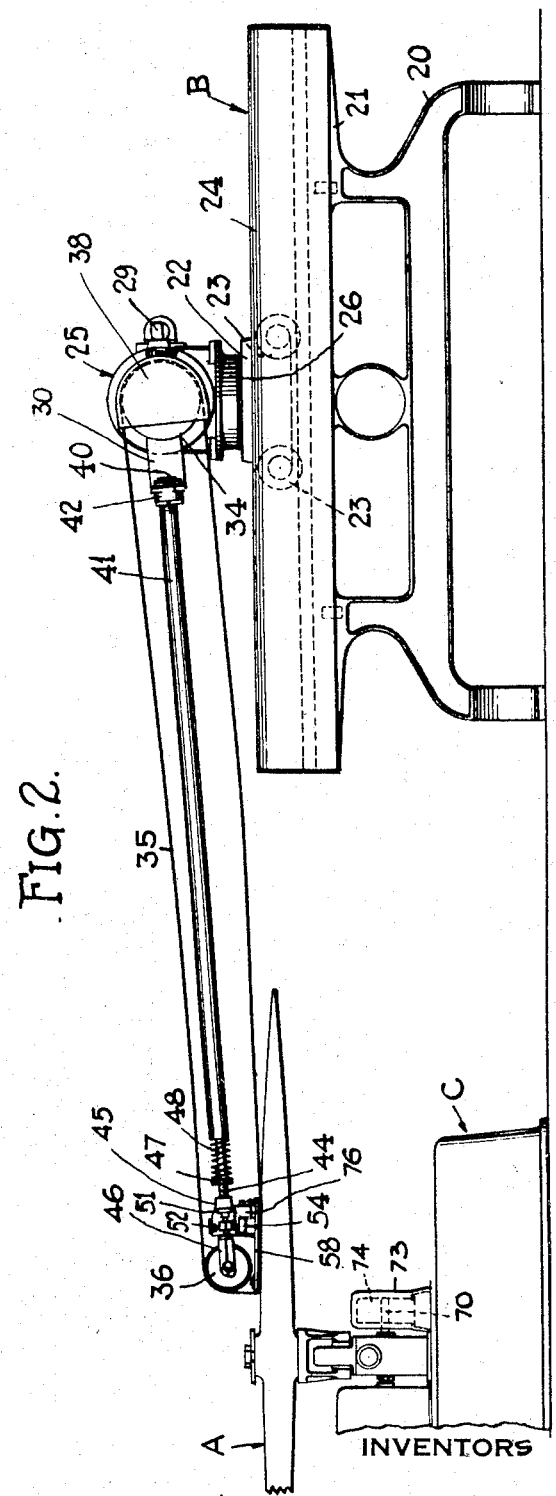

INVENTORS
Edward W. Curtis & A. V. Breed.
BY their ATTORNEY

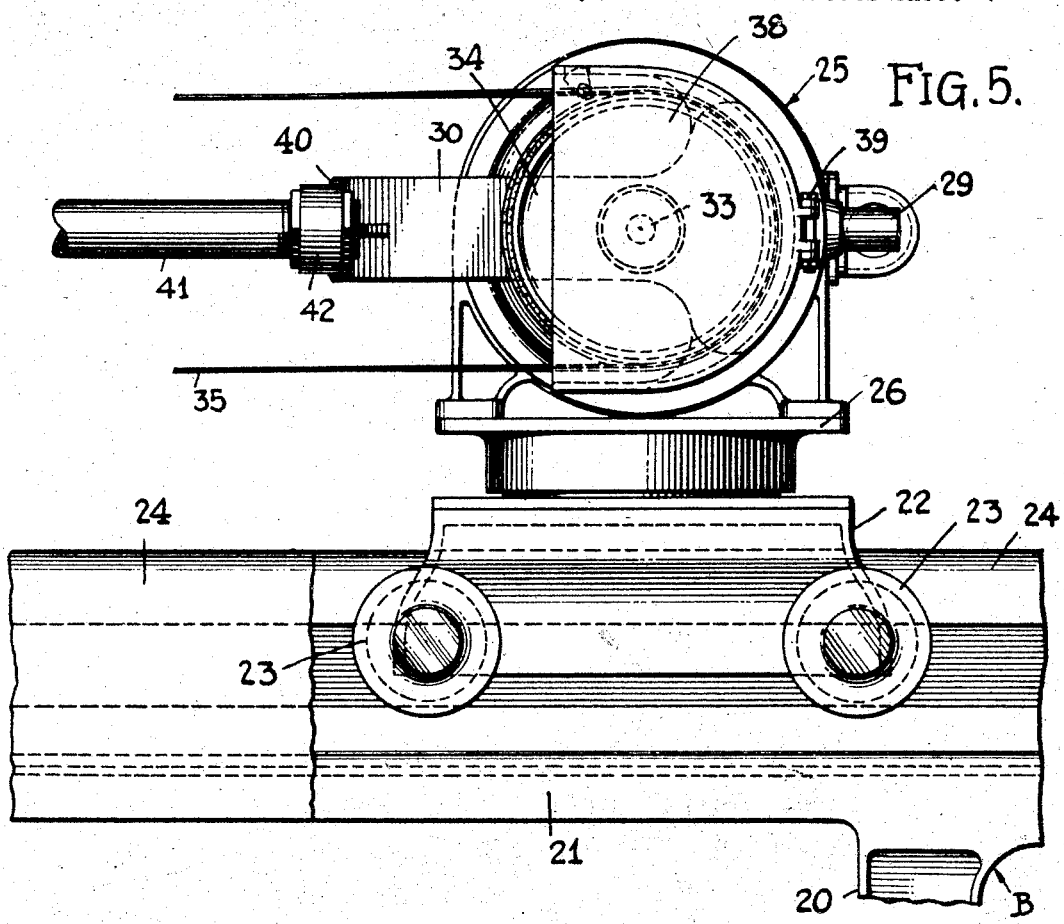
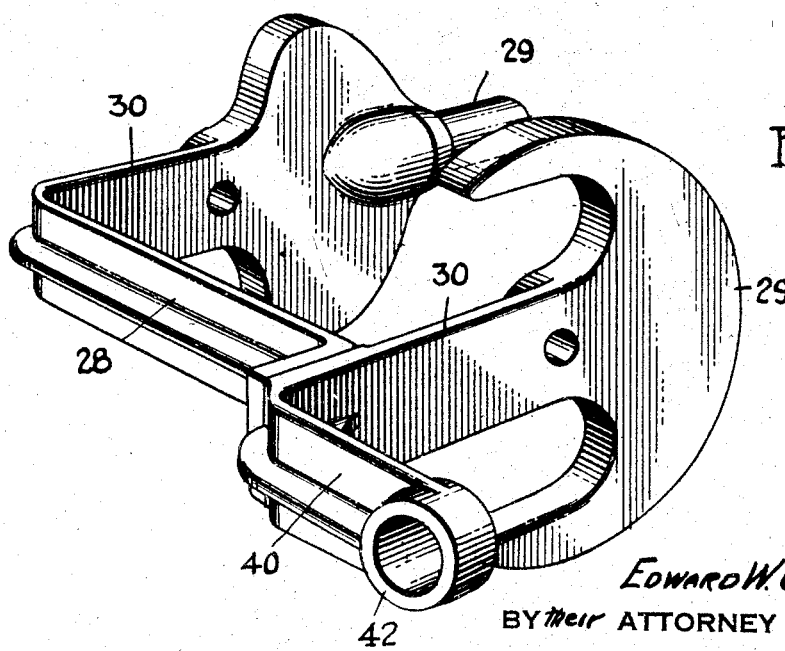

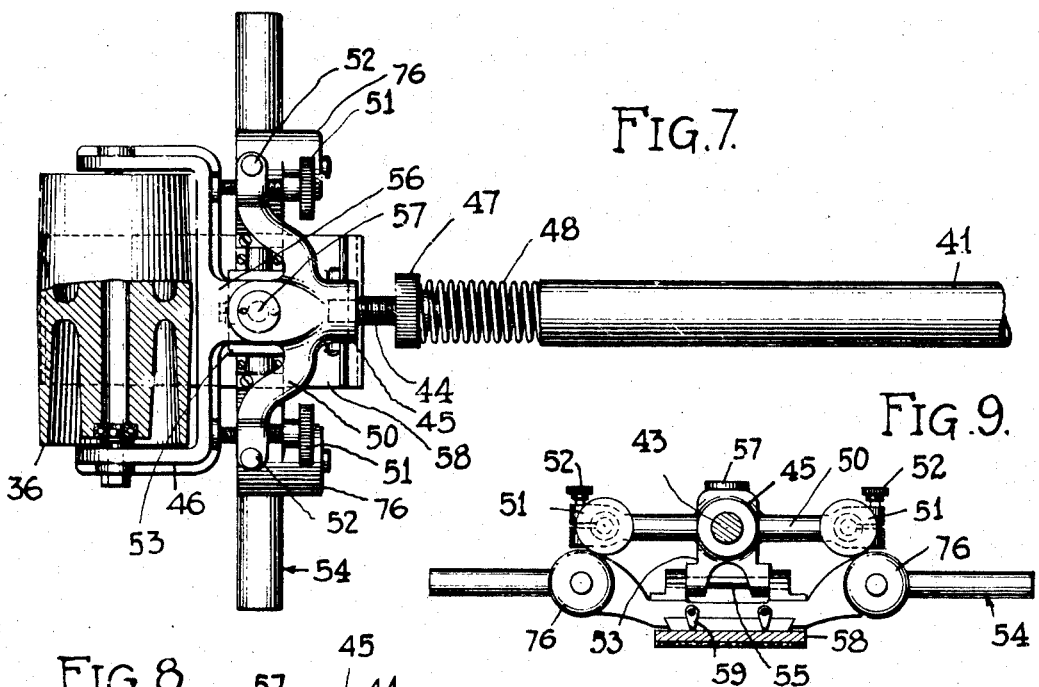
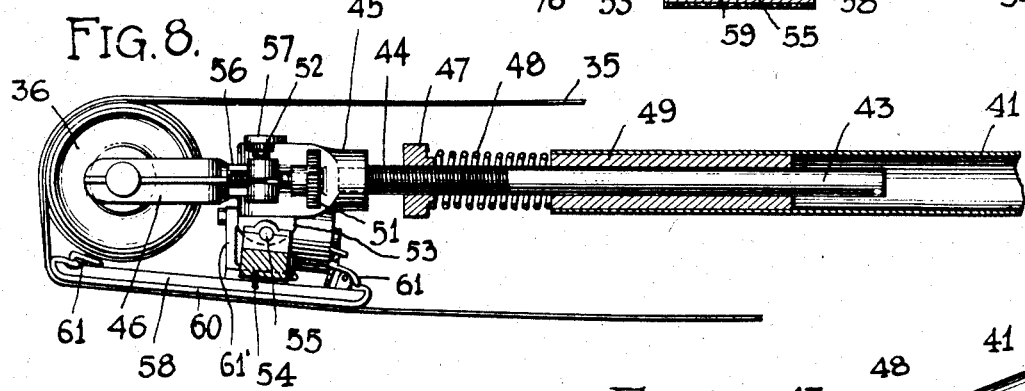
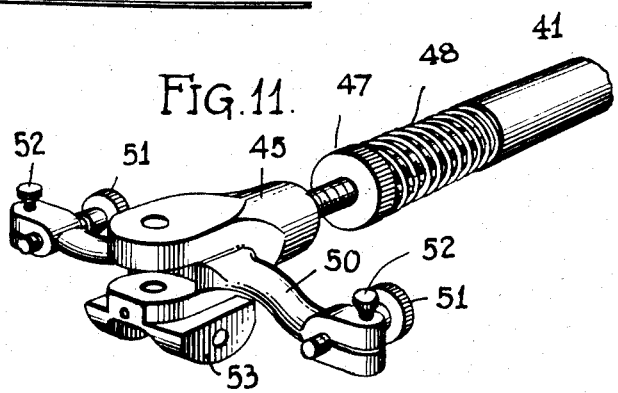
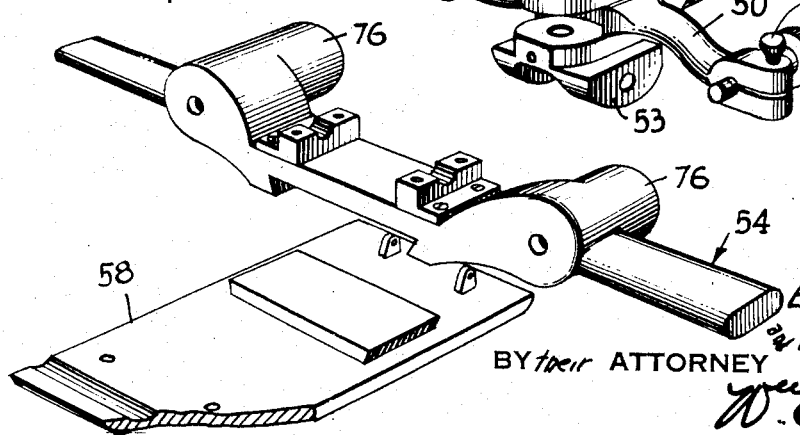

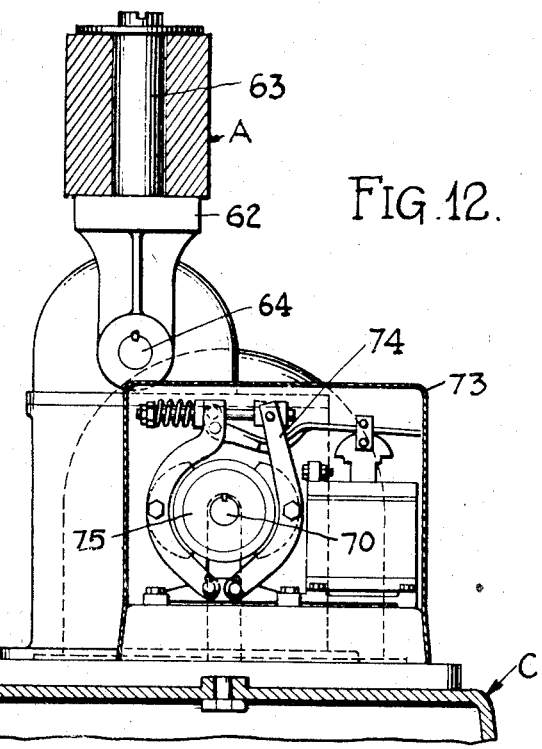
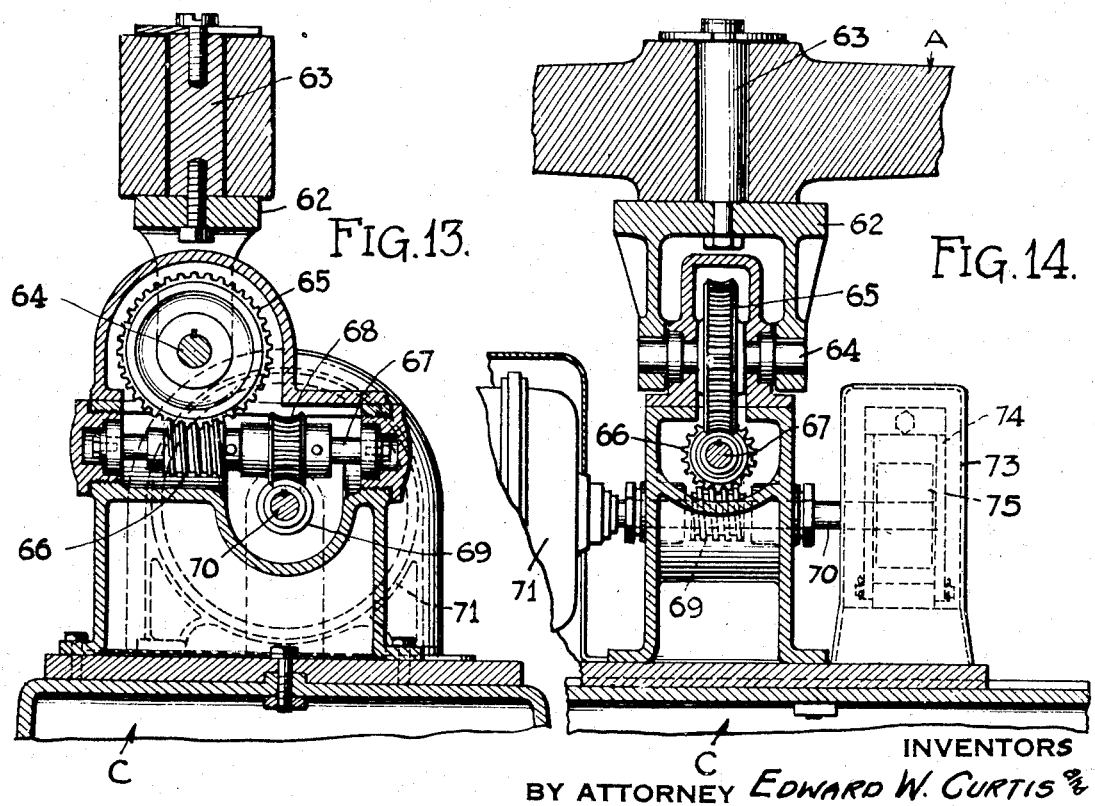

Patented Sept. 25, 1934

1,974,806

UNITED STATES PATENT OFFICE 1,974,806

SURFACING MACHINE

Edward W. Curtis and Alfred V. Breed, Jamestown, N. Y., assignors to Curtis Machine Corporation, a corporation of New York Application February 21, 1931, Serial No. 517,526

11 Claims. (Cl. 51—135)

Our invention relates to surfacing machines.

One object of the invention is to provide in a surfacing machine a belt of surfacing material.

A further object of the invention is to mount said belt as to admit of its being moved bodily in any and all directions with respect to the object or article to be surfaced.

A further object of the invention is to provide for the belt a shoe or pad by means of which the belt may be twisted or warped or its geometric shape changed, and by means of which "whipping" is prevented at the point of contact between the belt and the article being surfaced.

A further object of the invention is to provide for the belt and its supporting frame a power unit by means of which the belt is driven, said power unit being movable bodily along a track relatively to the article and said belt and belt frame being movable both with and with respect to the power unit.

A further object of the invention is to equip the belt frame with a suitable grip or handle by means of which the indicated movements of the belt are manually controlled and by means of which the shoe or pad can, while the belt is in motion, be adjusted.

A further object of the invention is to provide a rest or support for the article to be surfaced, which said rest, and hence the article, is freely mechanically movable in its relation to the belt of surfacing material.

A still further object of the invention is to so organize the control for said rest as to admit of its operation without releasing the belt-frame-grip or handle.

Other and further objects of the invention will be hereinafter set forth.

The advantages of a machine thus characterized are as follows: (1) It is a one-man power operated machine. (2) Not only is the article movable in its relation to the belt, but the belt in its entirety is in turn movable from a substantially horizontal to a substantially vertical position in its relation to the article. (3) In addition to its movement from a substantially horizontal to a substantially vertical position, the belt can be twisted, tilted or warped at its point of contact with the article and can thus be made to enter and surface short and irregular curves. (4) All movements of the belt, the shoe or pad, and the work rest, are centered for control in the belt-frame-grip or handle. (5) All phases of surfacing such as sanding, buffing, polishing, etc., can be accomplished with equal facility. It is only necessary that a belt of one class be substituted for that of another. (6) Due to the belt frame mounting and construction, the belt, while in motion, is at all times kept sufficiently taut and cannot ride off either the driving or the idler pulley. (7) By providing an adjustable shoe or pad across which the belt is drawn at its point of contact with the article, all vibration or whipping of the belt is eliminated. A perfectly smooth, as distinguished from a wavy or irregular finish is thus assured. (8) The article acted upon can be rolled or turned at the will of the operator to thus give the desired belt contact over its full transverse dimension. In other words, being a one-man machine, power drive, capable of high speed and adapted to all shapes and sizes of articles or objects, wood or metal, time is saved, manufacturing cost is reduced, and the machine can be used to advantage in surfacing and finishing such ordinary commercial articles as automobile bodies, cowls, aeronautical propellers, and in fact any and all articles or objects of irregular shape or form.

In the drawings, wherein like reference characters denote like or corresponding parts:

Fig. 1 is a plan view of the complete machine;

Fig. 2 is a side elevation;

Fig. 5 is a side elevation of the structure illustrated in Fig. 3;

Fig. 6 is a perspective view of the counterweighted yoke forming a part of the belt frame;

Fig. 7 is a plan view (partly in section) of the outer end portion of the belt frame showing the mounting for the idler pulley, the shoe or pad, and the belt-frame-grip or handle;

Fig. 8 is an end view of the belt-frame-grip or handle; the belt frame and shoe or pad being shown in transverse section;

Fig. 9 is essentially a side elevation of the structure illustrated in Fig. 7;

Fig. 10 is a perspective view of the belt-frame-grip or handle and its associated shoe or pad, the latter, for the sake of clearance, being shown detached;

Fig. 11 is a perspective view of the outer end portion of the belt frame;

Fig. 12 is an end view (partly in section) of the article support or rest;

Fig. 13 is a transverse vertical sectional view of said rest, and

Fig. 14 is a sectional view of the rest taken at right-angles to the section of Fig. 13.

In the embodiment of the invention selected for illustration an aeronautical propeller A is shown as the object or article to be surfaced. As previously stated, however, any object or article can be surfaced thru the operation of the machine. The machine per se comprises essentially two units, designated respectively B and C. Said units B and C are preferably so spaced as to admit of the belt, forming a part of the unit B, being swung into and out of surfacing contact with the article A to be surfaced. The article A (as indicated in Fig. 2) is removably fastened to the unit C.

Figure 3:
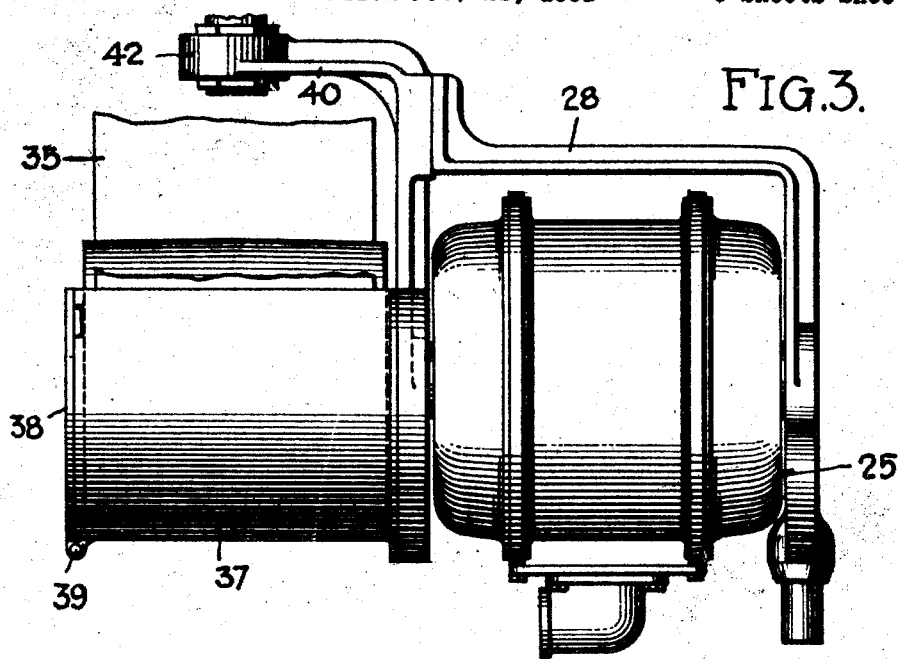
Fig. 3 is a plan view of the power unit by means of which the belt is driven and of the yoke mounted thereon and by means of which the belt frame is supported.
Figure 4:
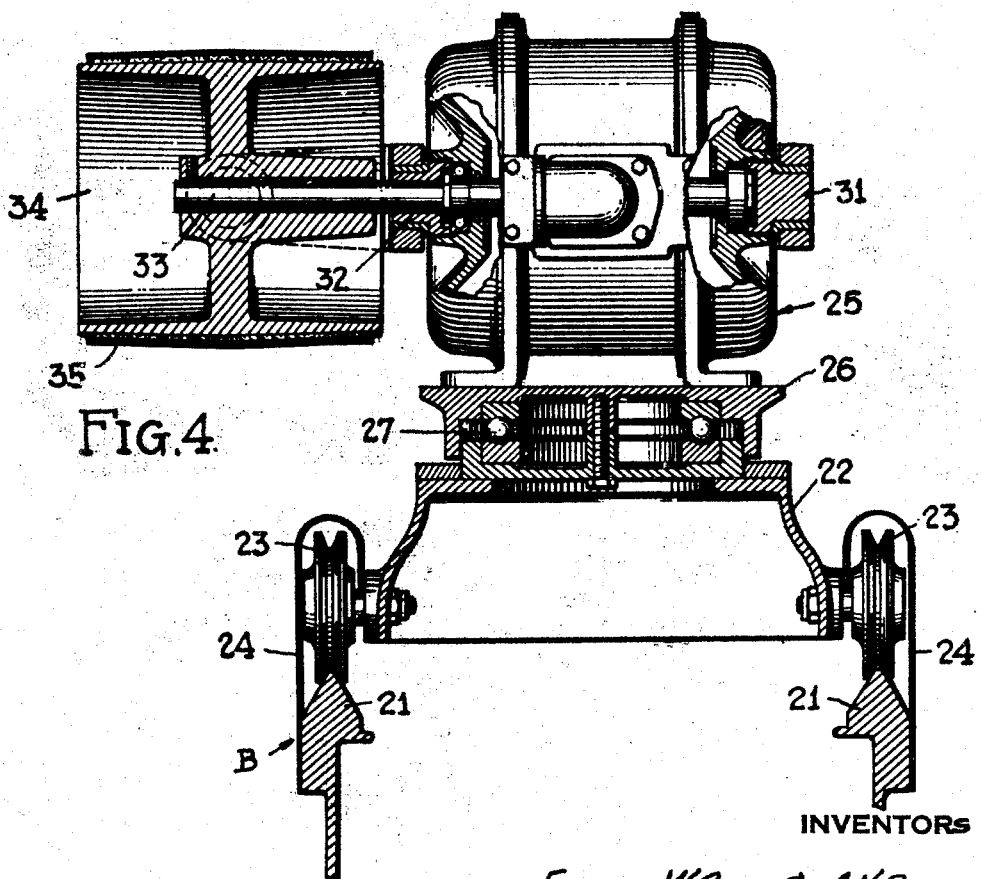
Fig. 4 is a transverse vertical sectional view of the structure illustrated in Fig. 3.

The details of construction of the unit B are best illustrated in Figs. 1 to 10, inclusive. Said unit comprises a table or stand 20 having parallel rails 21—21 either attached thereto or forming a part thereof. Upon said rails 21—21 a traveling carriage 22 is mounted. Wheels 23 (four in number), engaging the rails permit said carriage to be rolled from one to the other end of the track. If desired, dust guards 24 may be fastened to the rails 21—21 to overhang the wheels 23.

Mounted upon said carriage 22 is an electric motor designated in its entirety as 25. Said motor is movable both with and with respect to the carriage. As the carriage is moved along the track the motor 25 moves with it. Its movement with respect to the carriage is made possible by the ball-bearing mounting illustrated in Fig. 4. Preferably said mounting comprises a base casting 26 to which the motor 25 is directly fastened, and a ball race 27 interposed between said base and the carriage 22. Thus mounted the motor 25 may be freely rotated in its relation to said carriage.

The motor 25 is an electric motor of more or less conventional design. To said motor there is attached a supporting yoke 28. Said yoke 28 (see Fig. 6) is suitably counter-balanced or counter-weighted as indicated at 29—29. Its arms or extensions 30—30 straddle the motor, one said arm having a pivotal connection with a stub shaft 31 and the other said arm having a pivotal connection with a bushing 32 encircling the motor shaft 33. Thus mounted said yoke 28 is freely pivotally movable about the axis of the motor shaft 33.

The shaft 33, at one side of the motor, extends outwardly therebeyond and has mounted thereon a driving or power pulley 34. Over this pulley an endless belt 35 of surfacing material is carried. From said pulley the belt 35 extends off at right-angles to the axis of the motor shaft 33, and at its extended end is carried over an idler pulley 36 mounted at the outer end of a belt supporting frame which is in turn carried by or may be said to form a part of the pivoted yoke 28. If desired, a guard 37 may be provided at the driving end of the belt, which said guard, to admit of the belt removal, is in turn provided with a cover or end plate 38 hinged as at 39.

The frame, of which the yoke 28 forms a part, is preferably coextensive with the belt 35. It is pivoted at its inner end to the motor 25 and at its outer end carries the idler pulley 36. To support said pulley 36 at the outer or overhanging end of the belt 35, the yoke 28 has attached to an extension 40 thereof a reach rod 41. Said rod 41 is preferably hollow throughout and at its inner end is threaded in a sleeve or collar 42 formed upon the outer end of the yoke extension 40. At its opposite end said rod 41 has mounted for sliding or telescoping movement therein, a rod extension 43, which said extension, throughout a portion of its length, is threaded as at 44 and has mounted thereon a fitting 45 by means of which the idler pulley yoke 46 is supported. Said rod extension 44 is also provided with an abutment 47 against which one end of a spring 48 is adapted to bear. By adjusting said nut 47 lengthwise of the rod extension, the spring loading may be varied. At its opposite end the spring 48 bears directly upon a filler 49 thru which the rod extension 43 is passed for both rotation and longitudinal sliding movement in its relation to the rod 41.

The fitting 45 is forked at its outer end and has extending laterally out therefrom arms 50 carrying set screws 51. These set screws 51 bear at one end on the idler pulley yoke 46 and by their engagement with said yoke at opposite sides of its point of support hold it rigidly in adjusted position. To prevent a loosening of the set screws 51 lock screws 52 are provided.

In addition to the arms 50 which project laterally out from the fitting 45, said fitting has formed on its underside integral spaced lugs 53. Said lugs 53 provide a means of attachment for the belt-frame-grip or handle 54. The belt-frame-grip or handle 54 (see Fig. 10) extends crosswise of the fitting 45 and intermediately of its ends is pivotally fastened as at 55 to said fitting, the pivot axis extending transversely of the belt frame so as to admit of the grip or handle 54 being turned or rotated about its longitudinal axis. In this connection it should be noted that the lugs 53 are rounded on their underside. That the idler pulley yoke may be properly adjusted in its relation to said fitting 45, said yoke has formed thereon an extension 56 thru which a pivot pin 57 is carried.

The belt-frame-grip or handle 54 has detachably fastened thereto against its under-surface a shoe or pad 58. Said shoe or pad, on its underside, is preferably felt lined, and it is over such felt lined face of the shoe that the belting 35 is drawn. To fasten the shoe 58 against the underside of said grip or handle 54 a sliding tongue and groove connection between the shoe and the handle is established. Suitable means, indicated at 59, (Fig. 9) prevents the unintentional sliding movement of the shoe. The means for fastening the lining 60 to the shoe 58 comprises suitable fasteners 61 mounted on the top or inner face of the shoe. Also, to prevent contact between the shoe and the idler pulley 36, a stop 62, hung from the fitting 45 may be provided.

The shoe 58, it will be noted, is directly fastened to the belt-frame-grip or handle 54. Being thus fastened, any movement imparted to said grip or handle is immediately imparted to the shoe. Said grip or handle, as previously intimated, is not only rotatable about an axis extending transversely of the belt frame, but it is rotatable also about an axis extending longitudinally of said frame. Its rotation about said last mentioned axis enables the operator to twist or warp the belt as desired, whereas its rotation about said first mentioned axis admits of a change in the geometrical shape of the belt. As the shoe is rotated about an axis extending longitudinally of the belt frame, the axis of the idler pulley 36 is correspondingly displaced in its relation to the driving pulley 34. Movement of the shoe about the transverse axis of the belt frame has no effect whatsoever upon the idler pulley. This latter adjustment, however, does tend to tighten the belt, which said tendency is automatically relieved by the telescopic movement of the rod extension 43 against the urge of the spring 48. It is this freedom of movement of the shoe 58 which enables the operator to surface both irregular and plane surfaces.

The unit C upon which the article A to be surfaced is mounted, comprises a table yoke or rest 62 having mounted thereon a spindle 63 about which the article may be rotated and by means of which it is fastened to the rest. Said rest is mounted on a shaft 64 carrying a worm wheel 65 driven thru a worm gear 66 mounted on a shaft 67. Said shaft 67 extends at right-angles to the shaft 64 and is in turn driven by a gear 68 in mesh with a worm 69 mounted on a shaft 70 parallel with the shaft 64. The shaft 70 is driven by an electric motor 71 and extends thru the housing 72 within which the worm 69 is enclosed to extend beyond said housing into a casing 73 within which suitable magnetic brake mechanism 74 is enclosed. Said shaft 70, within the casing 73, has mounted thereon a brake drum 75 with which the magnetic brake mechanism is adapted to cooperate in automatically arresting the movement of the rest 68 when activated by the motor 71. The motor 71 is a reversing motor and is controlled in its operation by suitable push buttons (not shown) adapted to be carried by the grip or handle 54 in the enlargements 76—76 thereof. Suitable wiring (not shown) extends from the push buttons to the motor 71. As the motor is operated the rest 62 is rotated about the axis of the shaft 64 so as to adjust or change the position of the article A in its relation to the belt 35.

The operation of the machine is as follows: The article to be surfaced is first fastened upon the motor activated rest 62. With the article in place the motor 25 for driving the belt 35 is started. The operator thereupon, and while standing at one side of the belt, reaches across with one hand and grasps the handle or grip on the opposite side of the belt. With the other hand the near handle is gripped. Thus held, the handle 54 may be tilted laterally or longitudinally to bring the active portion of the belt 35, i. e., that portion in contact with the shoe or pad 58, into firm engagement with the particular portion of the article which it is desired to surface. This is true whether or not the surface of the article acted upon is plane, concave, convex, or of any other irregular surface. Having surfaced by means of the moving belt the article A from edge to edge, the belt frame and the motor by which the belt is driven, can be moved along its supporting track so as to bring the shoe in a different position of adjustment with respect to the article being surfaced. At the same time, and regardless of the position of the belt 35, the operator can, without letting loose of the grip or handle 54, by means of the push button control and the motor activated rest, shift the rest 62, and hence the article, back and forth across the path of the belt. By pressing the push button on the far grip of the handle 54, the rest is swung to the right or in one direction and by pushing the button on the near grip of the handle the rest is swung to the left or in the opposite direction. The moment pressure on either button is removed the magnetic brake mechanism 74 acts automatically to prevent a continued movement of the rest. The complete machine, therefore, is under perfect control at all times and can be operated continuously by one man with the maximum of saving both in labor and cost.

It should be noted in conclusion that the belt is driven by a motor mounted on a traveling carriage and that it can be tipped at any angle from the vertical to the horizontal while in motion. The machine will do irregular surfacing by the tilting of the pad or shoe which is attached to the handle, and is at all times under the direct control of the operator. The article acted upon can be turned at will, either backward or forward, and is controlled in its movement from one and the same handle as that providing for the indicated movements of the belt and shoe. This is accomplished by the operator touching the push button control which in turn operates a reverse switch on the motor 71.

In other belt surfacing machines the article is either moved into or out of engagement with the belt, or it is fastened to a table and the belt pressed down on the article. In either case, no firm flat surface is provided at the point of contact of the article with the belt, and the result is that an uneven and undesirable surfacing is inevitable. By the present invention a perfect surfacing is obtained. At all times the active portion of the length of the belt may be made to follow any concaved or convexed or other irregular surface, and at the same time, if necessary, made to round off or surface even the edges or sides of the article acted upon. Moreover, by reason of the peculiar mounting provided at the outer end of the belt support, the idler pulley is free to yield inwardly and at the same time is also free, as the shoe is tilted, to tilt laterally to a corresponding extent. Such movement of the idler pulley acts to prevent the belt from riding off of the surface of the pulley as it is warped or as its geometrical shape is changed.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In a surfacing machine, a drive pulley, an arm pivoted about said pulley axis for swinging movement, a device carried by said arm for movement along the axis of said arm and for pivotal movement about said arm axis, hand grips carried by said device for controlling the movement thereof, an idler pulley carried by said device, and an abrasive surfacing belt adapted to run over said idler pulley and said drive pulley, said device engaging the inner run of said belt for guiding it over the work to be surfaced.

2. In a surfacing machine, in combination, a drive pulley, an arm pivoted about said pulley axis for swinging movement, a device carried by said arm for movement along the axis of said arm and for pivotal movement about said arm axis, hand grips carried by said device for controlling the movement thereof, an idler pulley carried by said device, an abrasive surfacing belt adapted to run over said idler pulley and said drive pulley, and means for adjusting the position of said pulley with respect to said device, said device engaging the inner run of said belt for guiding it over the work to be surfaced.

3. In a surfacing machine, in combination, a drive pulley, an arm pivoted about said pulley axis for swinging movement, a device carried by said arm for movement along the axis of said arm and for pivotal movement about said arm axis, hand grips carried by said device for controlling the movement thereof, an idler pulley carried by said device, a belt adapted to run over said idler pulley and said drive pulley, means for adjusting the position of said pulley with respect to said device, and a shoe carried by said device for contacting the inner surface of said belt to provide a bearing surface for said belt when brought into contact with an article to be surfaced.

4. In a continuous belt type surfacing machine, a pair of spaced pulleys, a belt of surfacing material adapted to run over said pulleys, a shoe intermediate said pulleys and adapted to bear on the inner surface of a run of said belt, said shoe being provided with a pivot substantially parallel to the run of said belt and about which said shoe is adapted to swing for twisting said belt out of its normal running plane, and handles for said shoe by which it may be caused to twist said belt.

5. In combination with a continuous belt type surfacing machine, a support, an arm extending off from said support and adapted to be swung with respect thereto, a belt carried by said arm, means carried by and pivoted to said arm for engaging said belt, and handles for controlling the position of said means, said means by movement of said handles being adapted to twist said belt about a longitudinal axis thereof and to deform said belt about lateral axes thereof.

6. In combination with a continuous belt type surfacing machine, a support, a drive pulley carried thereby, an arm extending off from said support, an idler pulley carried at the outer end of said arm, a belt adapted to run over said pulleys, means intermediate said pulleys and pivoted to said arm for engaging the inner surface of said belt, and handles carried by said means, said means being adapted to swing about an axis parallel to said arm axis and about said pivot, for twisting said belt and for changing the geometrical shape thereof, respectively.

7. In a surfacing machine, in combination, a support, a carriage movable along said support, a drive pulley borne for rotation on a hoizontal axis by said carriage, and said pulley being pivoted with respect to said carriage for swinging about a substantially vertical axis, an arm extending off from said pulley and pivoted on said horizontal pulley axis for swinging with respect to said carriage, an idler pulley mounted on said arm, said pulley being adapted to turn about an axis substantially normal to said arm, and means between said idler pulley and said arm for allowing the distance between the axes of said pulleys to be changed, said means being adapted to allow movement of said idler pulley axis to an angular position with respect to said drive pulley axis, and an abrasive belt adapted to run continuously over said pulleys.

8. In combination, in a continuous belt type surfacing machine having a device for warping and moving the belt with respect to the work to be surfaced, a base, a work rest pivoted to said base on an axis substantially parallel to the normal run of said belt, and power means for moving said work rest about said pivot.

9. In combination, in a continuous belt type surfacing machine, a sliding carriage, a drive pulley carried thereby, an arm pivoted adjacent said pulley, an idler pulley at the outer end of said arm, an abrasive belt running over said pulleys, handles adjacent said idler pulley for swinging said belt and said arm, a base, a work rest pivoted thereto on an axis substantially parallel to said carriage sides, and means for swinging said work rest on its pivot.

10. In a belt type surfacing machine for surfacing relatively long and narrow irregular objects, a work rest tiltable on an axis substantially parallel to the axis of the object to be surfaced, an abrasive belt having its run normally substantially parallel to the axis of the object to be surfaced, and means for moving and warping said belt to contact the irregular surfaces of the object.

11. In a surfacing machine in combination, a support, an arm pivoted with respect to said support, a pulley mounted on said arm for rotation, a continuous abrasive belt adapted to run over said pulley, hand grips adjacent said pulley for guiding said arm, said pulley and said belt, a work rest, a base therefor, power means for moving said work rest with respect to said base, said work rest being adapted to hold an article in the vicinity of said pulley, and means associated with said hand grips for controlling said power means.

EDWARD W. CURTIS.
ALFRED V. BREED.